(12) United States Patent
Zorzetto et al.

(10) Patent No.: US 9,638,152 B2
(45) Date of Patent: May 2, 2017

(54) ELECTRIC HEATER, HEATING DEVICE AND HEATING SYSTEM

(75) Inventors: Mauro Zorzetto, Casale Monferrato (IT); Alberto Barbano, San Germano Monferrato (IT); Paolo Colombo, Alessandria (IT); Mirco Arata, Alessandria (IT)

(73) Assignee: ELTEK S.P.A., Casale Monferrato (AL) (IT)

( * ) Notice: Subject to any disclaimer, the term of this patent is extended or adjusted under 35 U.S.C. 154(b) by 677 days.

(21) Appl. No.: 13/508,092

(22) PCT Filed: Nov. 2, 2010

(86) PCT No.: PCT/IB2010/054952
§ 371 (c)(1),
(2), (4) Date: May 22, 2012

(87) PCT Pub. No.: WO2011/055295
PCT Pub. Date: May 12, 2011

(65) Prior Publication Data
US 2012/0224839 A1    Sep. 6, 2012

(30) Foreign Application Priority Data
Nov. 6, 2009  (IT) .............................. TO2009A0853

(51) Int. Cl.
*F24H 1/10*    (2006.01)
*H05B 3/08*    (2006.01)
(Continued)

(52) U.S. Cl.
CPC ............ *F02M 53/02* (2013.01); *F02M 53/06* (2013.01)

(58) Field of Classification Search
CPC ............................... F02M 53/02; F02M 53/06
USPC ....... 392/485, 304, 321, 341, 345, 397, 401, 392/407, 424, 480, 481–483, 497, 502; 123/299, 304, 575, 549, 557, 456, 470, 123/468, 469, 447, 472; 239/1, 5, 13,
(Continued)

(56) References Cited

U.S. PATENT DOCUMENTS 3,594,544 A * 7/1971 Wunderlich ................... 392/496
4,935,687 A * 6/1990 Ton-That et al. ............. 392/347
(Continued)

FOREIGN PATENT DOCUMENTS

EP    2 071 159    6/2009
EP    2 194 261    6/2010
(Continued)

OTHER PUBLICATIONS

WO2008055725A1_translate.pdf.*
International Search Report issued Feb. 23, 2001 in PCT Application No. PCT/IB2010/054952, filed Nov. 2, 2010.

*Primary Examiner* — Dana Ross
*Assistant Examiner* — Ket D Dang
(74) *Attorney, Agent, or Firm* — Workman Nydegger

(57) ABSTRACT

An electric heater for fuel of endothermal engines, in particular for fuel systems called "common rail" and the like, includes a heating part and a terminal adapted to be associated with one end of the hollow body of a fuel feeding duct; advantageously, the terminal is at least partly made of plastic material. A fuel feeding duct to which the heater is applied, as well as to a fuel warm-up device, are also provided.

17 Claims, 12 Drawing Sheets

(51) Int. Cl.
*F02B 3/00* (2006.01)
*F02M 53/02* (2006.01)
*F02M 53/06* (2006.01)

(58) Field of Classification Search
USPC .... 239/128, 135, 136, 139, 461, 463, 533.1,
239/533.2, 533.9, 533.12, 533.15, 569,
239/583, 584, 600, 585.1–585.5;
219/541, 205, 270; 174/65 G, 151,
174/152 G, 153 G, 135
See application file for complete search history.

(56) References Cited

U.S. PATENT DOCUMENTS

| | | | |
|---|---|---|---|
| 6,102,303 A * | 8/2000 | Bright et al. | 239/135 |
| 2001/0042741 A1* | 11/2001 | Ballem | 219/205 |
| 2005/0084256 A1* | 4/2005 | Wieczorek | 392/485 |
| 2005/0211229 A1* | 9/2005 | Pellizzari et al. | 123/525 |
| 2006/0094566 A1* | 5/2006 | Keeler et al. | 477/111 |
| 2006/0140598 A1* | 6/2006 | Starck et al. | 392/441 |
| 2009/0107473 A1* | 4/2009 | Imoehl et al. | 123/549 |
| 2009/0133676 A1* | 5/2009 | Lepsch et al. | 123/549 |

FOREIGN PATENT DOCUMENTS

| | | | |
|---|---|---|---|
| FR | WO 2008055725 A1 * | 5/2008 | F02M 31/125 |
| JP | 8-338339 | 12/1996 | |
| WO | WO 2006/130938 | 12/2006 | |

* cited by examiner

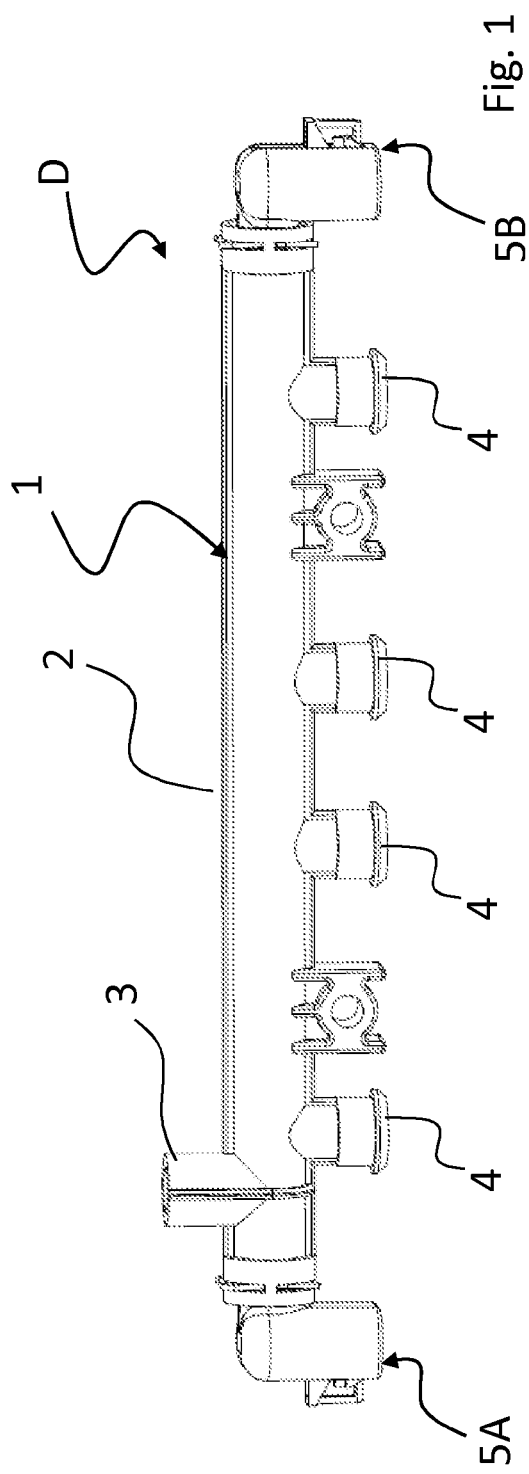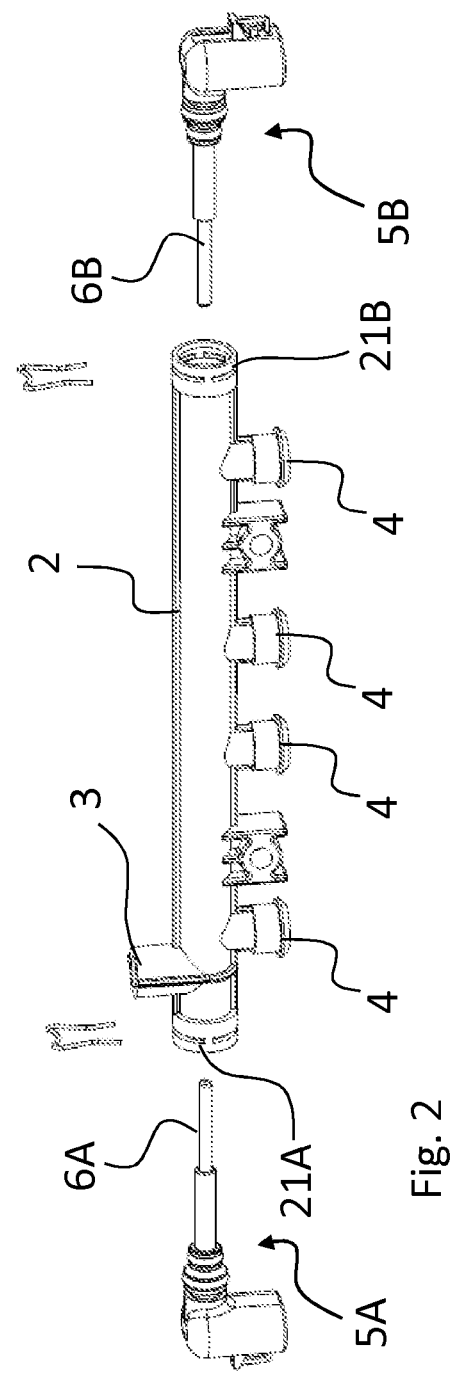

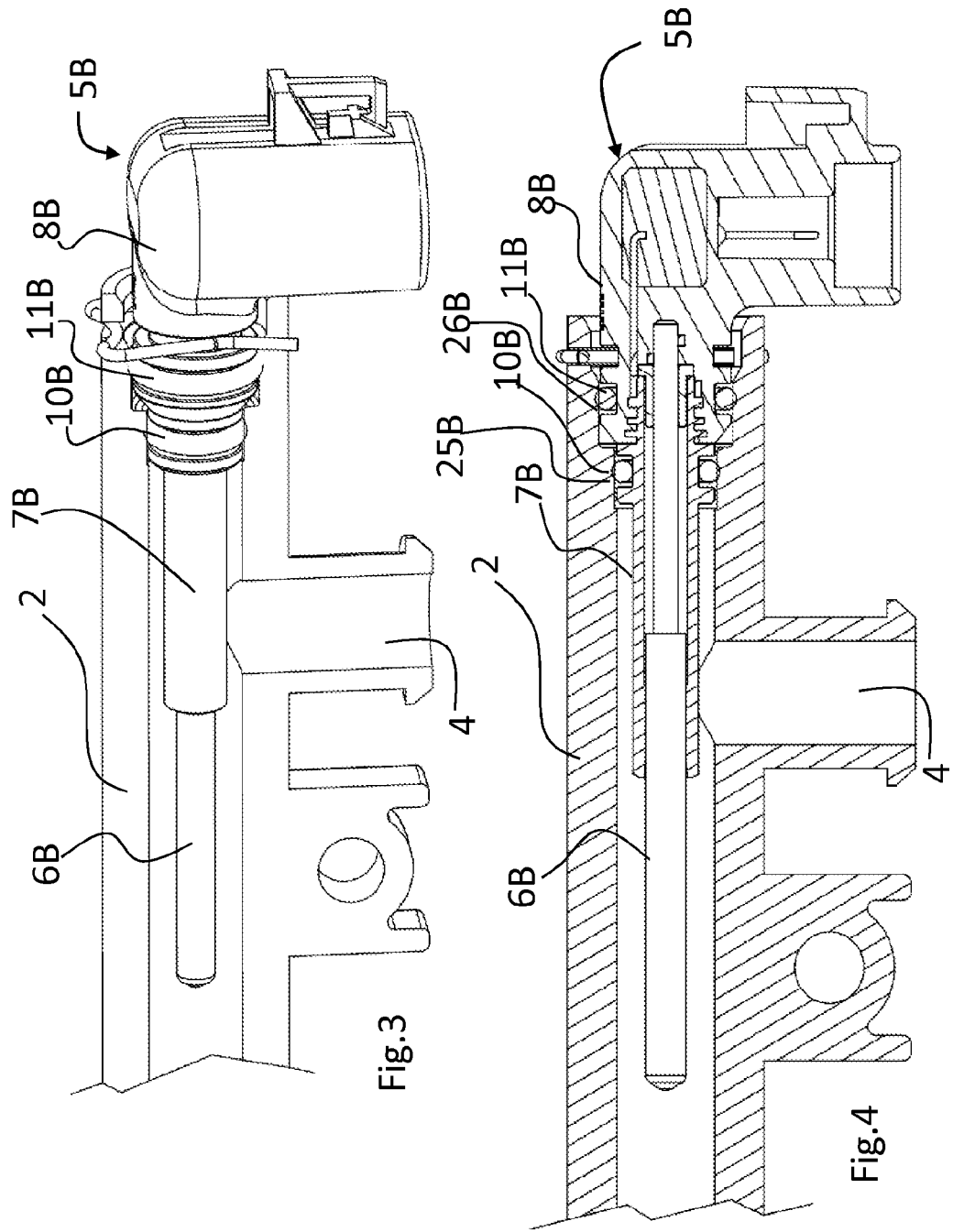

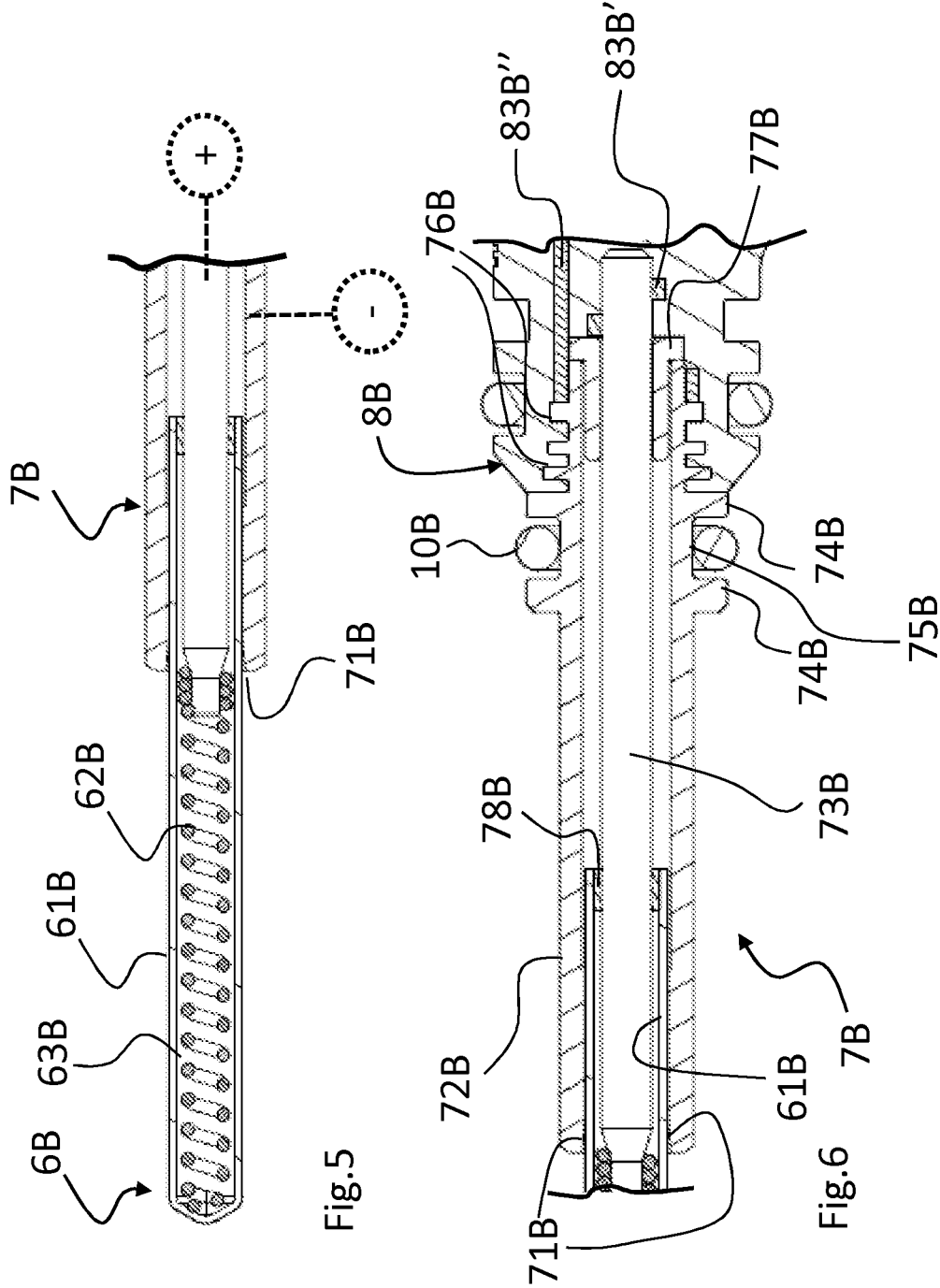

ELECTRIC HEATER, HEATING DEVICE AND HEATING SYSTEM

BACKGROUND OF THE INVENTION

1. Field of the Invention

The present invention relates to an electric heater, a fuel warm-up device and a fuel feeding duct for endothermal engines.

2. Present State of the Art

As known, in internal combustion engines a mixture of fuel and combustive agent reacts within a combustion chamber (comprised between a cylinder and a piston), so as to produce mechanical work starting from a chemical combustion reaction.

The term "fuel" refers to the chemical substance or mixture that becomes oxidised, whereas the term "combustive agent" refers to the chemical substance or mixture that is reduced during the chemical combustion reaction. In general, the actual fuel is never entirely pure, and often contains additives (which may participate in the combustion reaction only partially or not at all), and the actual combustive agent is typically air (i.e. a mixture of several gases, of which only one, i.e. oxygen, participates in the combustion reaction); for the purposes of the present invention, however, the term "fuel" will simply refer to that liquid or fluid, e.g. petrol, diesel oil, alcohol or fuel oil, which is mixed with the combustive agent in order to bring about the combustion reaction, whether it includes or not any additives or a portion of said combustive agent.

Aiming at improving the combustion (as regards the quantity of fuel actually used and the homogeneity of the reaction occurring in the combustion chamber) and minimising harmful exhaust emissions, as well as in an attempt to maximise efficiency, a known solution provides for warming up the fuel before it enters the combustion chamber(s).

This measure is also useful for dealing with the following two problems:

optimising the combustion in every operating condition of the engine, facilitating cold starting.

These problems are especially felt when the fuel is diesel oil, like in diesel engines, or a biofuel or an alcohol, such as ethanol, obtained for example from fermentation of vegetable products (a country where this type of fuel is widespread is Brazil), or a fuel oil.

It should also be taken into account that there are engines designed for using more than one fuel type, in particular two different fuel types (e.g. petrol and alcohol): in these engines, the two fuels can be used alternately, and therefore a situation may arise where one fuel needs to be warmed up while the other one does not or does to a lesser extent, or they can be used as a mixture according to a predefined and/or variable ratio of said two different fuels; the mixing process may take place automatically, with ratios or percentages determined by an electronic control unit of the vehicle.

In the engine industry, a currently widespread technology is the so-called "common rail" or "fuel rail", which in substance is an injection system wherein the fuel is delivered at a very high pressure through a single feeding duct that feeds a plurality of cylinders (hence the definitions "common rail" and "fuel rail").

Between the "common rail" or "fuel rail" and the cylinders' combustion chambers there are the injectors, which may be connected to the feeding duct either directly or through very short ducts branching off from the feeding duct itself; in general, there is a single feeding duct for the whole engine.

For engines equipped with a "common rail" or "fuel rail", i.e. a feeding duct, different solutions have been developed for warming up the fuel before delivering it into the combustion chamber: according to a first type of solution, the fuel is warmed up in the pump that delivers it to the feeding duct (as described, for example, in patent DE19918227); according to a second type, the fuel is warmed up by a plurality of heaters installed at the single injectors that feed the cylinders (as described, for example, in patents WO2006/130938 and DE10340159); according to a third type, the fuel is warmed up by means of a heated adapter placed between the feeding duct and the injectors (as described, for example, in patent WO2007/028663).

Yet another type of solution provides for heating the fuel as it flows through the feeding duct, as described for example in patent publication JP83338339. The present invention belongs to this type of solution; in this case, the feeding duct also operates as a real warm-up device.

This document teaches to use for that purpose an electric heater (also called "glow plug" by those skilled in the art), which comprises a single electric winding supplied with direct current that gets heated by Joule effect.

In order to insulate the winding from the fuel flowing through the feeding duct, the electric heater comprises a sealed casing that surrounds the winding, which substantially extends for the whole length of the feeding duct.

In the device of Japanese patent JP83338339, the heater is screwed into the feeding duct by means of respective threads.

This solution requires the use of appropriate materials in order to obtain a good sealing of the threaded connections at the high temperatures reached in operation.

Furthermore, in order to supply the winding of this heater with direct current, the latter must be connected on one side to a ground point, e.g. a point of the vehicle's chassis, and on the other side to the positive terminal of the vehicle's battery; for this purpose, two distinct electric connections must therefore be provided.

These two conditions make it almost mandatory to use metal materials for manufacturing both the feeding duct and the electric heater.

As a matter of fact, metal materials such as aluminium, steel or other alloys can provide stable and sealed threaded connections even in the presence of considerable thermal excursions like those occurring in the warm-up devices referred to herein.

Therefore, in the solution disclosed in JP83338339 one of the two electric connections, e.g. the ground connection, is accomplished by means of a threaded fitting screwed into a metal feeding duct, which in turn must be electrically connected to a ground point, such as a part of the vehicle.

This implies a limitation as to the material of the feeding duct, which may only be made of metal, as well as risks of failure of the electric connection, since the latter is accomplished through multiple mechanical fastenings for different devices, resulting in the risk of anomalous contact resistance in series with the power supply circuit of the heater, which typically draws high currents, where any anomalous resistance increase might determine anomalous energy dissipation or jeopardise the correct supply of power to the electric heater.

Moreover, the heater casing extending along the whole feeding duct hinders the regular fuel flow.

Also other types of warm-up devices are known, wherein the electric heater or glow plug comprises a heat sink typically consisting of a metal mass preferably having a tubular shape and provided with holes for allowing the fuel to enter. The heat sink is placed in a condition of thermal exchange by conduction with the heater, which in turn is in a condition of thermal exchange with the fuel. However, such a type of heater, and the warm-up device thereof, suffer from the drawback of having a high thermal inertia, i.e. of not being able to heat the fuel rapidly because the heat sink must be heated first, which then in turn will warm up the fuel.

Furthermore, in this solution the holes of the heat sink may get obstructed by sediments normally left by the fuel and by any dirt present in the latter, thus causing improper flow and reduced functionality of the feeding duct, as well as ineffective fuel heating.

An additional problem common to prior-art electric heaters and warm-up devices arises from the high temperatures reached in operation in the electric connection area.

Aiming at preventing damages, known heaters have a configuration like that shown in document JP83338339, i.e. with a threaded metallic ground fitting.

A further problem common to prior-art heaters relates to the fact that the fuel must be heated to a temperature lower than the vaporisation temperature, and therefore the heating effect must be limited: in the solutions known in the art this is accomplished by controlling the heater on time.

Yet another common drawback relates to the fact that in prior-art solutions a faulty on-time control is not detected, which might result in the winding getting overheated and damaged and the fuel vaporising.

SUMMARY OF THE INVENTION

The present invention aims at overcoming all these and other drawbacks of the prior art, in particular through at least one electric heater for fuel feeding ducts according to the appended claims, which are intended- as an integral part of the present description.

It is a first object of the present invention to provide an electric heater and/or a warm-up device and/or a heating system for a fuel used for feeding endothermal engines which is economical to manufacture and which ensures improved and reliable performance, preferably of the type that can be assembled at least partly in an automated manner.

It is a second object of the present invention to improve the structure and/or reliability of the heater and/or warm-up device and/or system in order to facilitate power supply connection operations, in particular by taking appropriate measures which allow plastic parts to be used.

It is another object of the present invention to ensure a proper seal among the various parts that make up the heater and/or warm-up device, so that there can be no infiltrations of dirt or water from the outside nor fuel leaks from the feeding duct.

It is a further object of the invention to provide an intrinsically safe electric heater and/or a warm-up device wherein overheating is prevented in the event of a malfunction.

Yet another object of the present invention is to provide a warm-up device which is less subject to clogging problems and which can warm up the fuel in a uniform manner.

The invention also relates to a fuel warm-up device in which a feeding duct is associated with two electric heaters, as well as to one such feeding duct.

BRIEF DESCRIPTION OF THE DRAWINGS

The features of the invention are set out specifically in the appended claims; said features and the advantages obtained therefrom will become more apparent from the following description, which is provided by way of non-limiting example with reference to the annexed drawings, wherein:

FIG. 1 is a perspective view of the heating device according to a first embodiment of the present invention;

FIG. 2 is a partially exploded perspective view of a heating device according to a first embodiment of the present invention;

FIG. 3 is a sectional view of a portion of the heating device of FIG. 1;

FIG. 4 is a sectional view of the electric heater of FIG. 3;

FIG. 5 is a sectional view of a first part of the electric heater of FIG. 3;

FIG. 6 is a sectional view of a second part of the electric heater of FIG. 3;

DETAILED DESCRIPTION OF THE PREFERRED EMBODIMENTS

Figure 11:
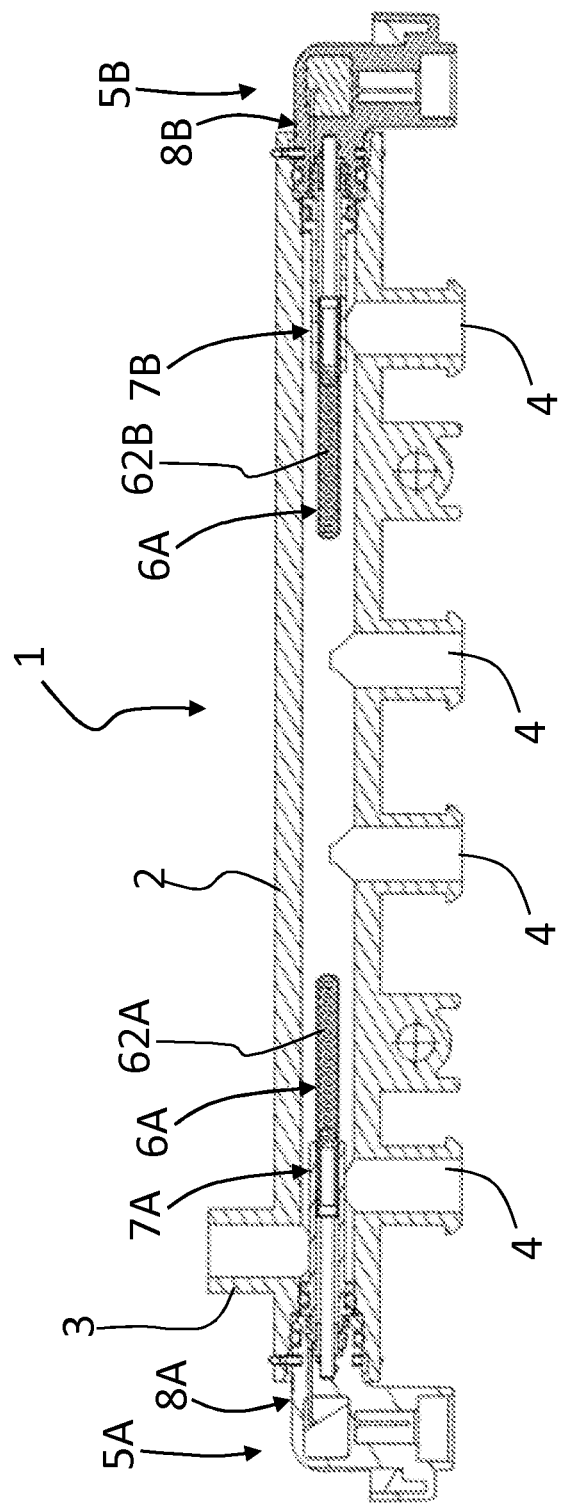
FIG. 11 is a sectional view of the heating device of FIG. 1.

Referring now to FIG. 1, there is shown an outside view of a fuel warm-up device D for endothermal engines, which comprises a feeding duct 1 in turn comprising a hollow body 2 that defines at least partly a feeding duct through which the fuel flows; FIG. 2 shows an exploded view and FIG. 11 shows a sectional view of the same heating device D.

The hollow body 2 comprises a fuel inlet, represented in the example provided by an intake port 3 through which the fuel enters an inner cavity where it is warmed up; it also has four outlets 4 directed towards as many injectors or branching ducts.

Of course, the number of outlets 4 usually matches the number of cylinders of the engine, and may therefore change as required; practical implementations may therefore also be configured with one, two, three, five, six, eight or more outlets. The hollow body 2 then has both free ends 21A and 21B open to allow for the insertion of the electric heaters 5A and 5B, as shown in the exploded view of FIG. 2, which thus also act as sealing plugs for the hollow body 2; for this purpose, the electric heaters 5A and 5B may advantageously be assembled and/or locked in a quick and safe manner.

In accordance with the teachings of the present invention, in fact, the electric heaters 5A and 5B constitute sealing plugs for the hollow body 2, and may advantageously be associated therewith by shape coupling.

Preferably the shape coupling is an interference fit.

Figure 9:
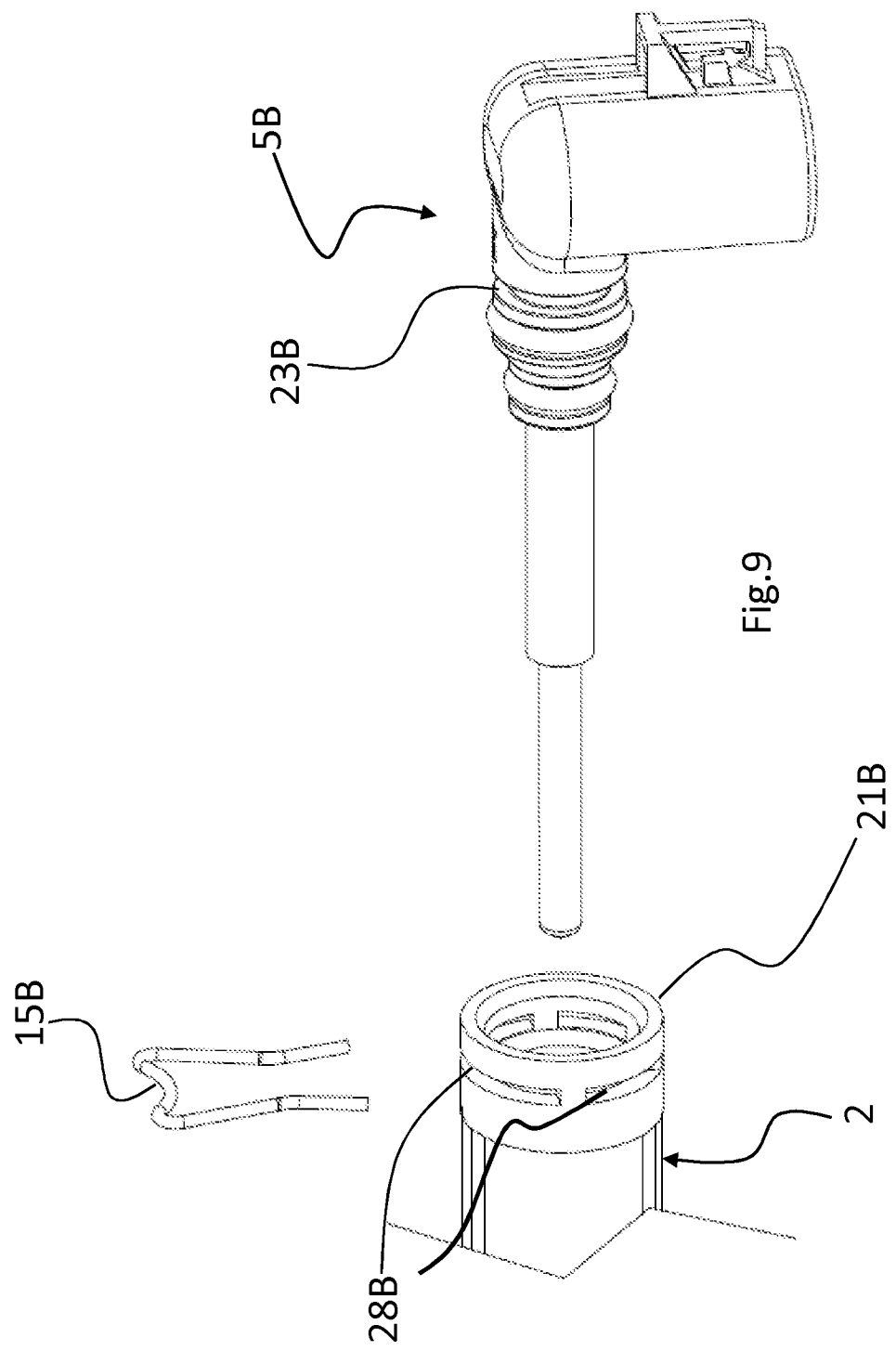
FIG. 9 shows a detail of the coupling between the electric heater of FIG. 3 and a body of the heating device of FIG. 1.

In fact, as can be seen in the annexed FIGS. 2 and 9 showing the heater 5B, the latter fits into the open end 21B of the hollow body 2, thereby plugging it in a simple and quick manner without needing any suitable threads, thus allowing different materials, whether plastic or metallic ones, to be coupled together.

The locking in position of the heater 5B is in fact advantageously ensured by mechanical fixing means, such as, for example, a cotter pin 15B fitting into the slot 28B provided on the end of the body 2 and engaging the heater 5B, thereby preventing it from coming off.

For this purpose, with reference also to FIG. 9, the heater 5B comprises a housing 23B for a fixing means, such as the cotter pin 15B that also engages the hollow body 2; it is preferably an annular or circular seat, in particular for facilitating the installation of the heater 5B in different angular positions, i.e. for allowing the heater 5B to rotate or move angularly when it is fitted in the body 2.

Of course, the man skilled in the art may advantageously employ other means for securing the heater 5B to the hollow body 2, such as dowels cooperating with suitable seats or the like.

As can be seen, the two electric heaters 5A and 5B are located at the opposite ends of the feeding duct 1 and are separate from each other, i.e. in a condition of thermal exchange by convection (through any fuel filling the hollow body 2) and possibly by irradiation, but not by conduction.

This offers a number of advantages: in the first place, the internal volume of the hollow body is freer than in prior-art solutions, in that the two electric heaters 5A and 5B only extend for a length shorter than half the total length of the hollow body, leaving thus free the central part thereof to advantage of the fuel flow towards the injectors.

Furthermore, in this solution there are no connection elements between the two heaters, except of course for the hollow body 2 whereon they are mounted, thus avoiding any clogging problems caused by dirt or the like, while at the same time avoiding the use of elements extending for the full length of the hollow body (as in known cases), which involves problems as regards their secure fixing in place and the presence of obstacles to the fuel flow.

With reference to FIG. 11, it should also be noted that in the installed condition, each electric heater 5A and 5B comprises an electric heating element 62A, 62B. An electric winding is an example of an electric heating element.

According to a teaching of the present invention, each electric heating element 62A, 62B extends within the body 2, preferably only in the region comprised between two adjacent outlets 4 for the injectors.

According to an advantageous optional feature, each electric heating element 62A, 62B does not extend over any of the outlets 4.

Tests carried out have shown that, in the configuration with two electric heaters 5A and 5B, this solution offers the best results in terms of homogeneous heating of the fuel in the feeding duct.

In particular, each electric heater 5A, 5B provides the best results in terms of homogeneous fuel heating in two adjacent ducts or outlets 4, i.e. two ducts or outlets 4 between which the electric heating element 62A, 62B of the corresponding electric heater 5A, 5B is interposed.

With reference also to FIGS. 3 and 4, it is possible to see the particular design of the electric heaters 5A and 5B according to the present invention: note that, for clarity, these figures show the device 5B only, being the device 5A absolutely similar; for the same reason, the following description will focus mainly on the electric heater 5B or anyway on at least one of the various electric heaters that may be used in a fuel heating device and/or heating system according to the invention; to this end, therefore, items identified by the same reference numerals but followed by a letter A or B must be considered to be identical, said letter referring to the electric heater 5A or 5B.

Referring now to the heater 5B, it comprises a heating end 6B, a spacer 7B and a terminal 8B coupled to one another, as shown in detail in FIGS. 4 to 7.

The heating end 6B is shown in greater detail in FIG. 5, and comprises in turn an outer casing 61B, having in particular a tubular shape closed at one end, which houses internally an electric heating element, consisting in the present example of an electric winding 62B having preferably a coil-like shape, suitable for being heated by Joule effect when subjected to a potential difference across its ends. Inside the casing 61B there is a material 63B being electrically insulating but a good heat conductor, such as, for example, magnesium, preferably in the form of powder or small compressed grains, which insulates the winding 62B electrically from the casing 61B.

FIG. 5 also diagrammatically shows the electric connection of the winding 62B, which will be described more in detail later on: for now, it just has to be said that it is connected across two poles between which an electric potential difference is established; in this regard, it should be noted that the casing 61B is itself a part of the power supply circuit, in that it places the winding 62B in electric contact with one of the two poles, in particular the negative or ground one, said casing 61B being electrically connected to one end of the winding 62B, in particular by welding.

For this purpose, the winding 61B is made of a conductive material, preferably metal, more preferably stainless steel, e.g. AISI 303 or INCONEL, so as to withstand the chemical attack of the fuel in which it is immersed in operation.

In FIG. 5 it is possible to see also the terminal end of the pin 73B shown in FIG. 6, which is electrically connected to the winding 62B and to one electric conductor of the terminal 8B, preferably the positive conductor.

The electric connection is made by brazing or interference fit or the like.

The pin 73B is insulated electrically from the other components of the electric heater 5B, e.g. from the hollow bushing 72B (which will be described more in detail later on), and is centered with respect to the casing 61B.

The centering of the pin 73B is obtained through a centering insulator 77B located at the terminal end of the pin opposite to the one coupled to the winding 62B and through a centering ring 78B arranged along the body of the pin 73B, between the latter and the casing 61B, preferably at the terminal edge of the casing 61B, so as to insulate them and prevent any short circuit.

Advantageously, during the process for manufacturing and assembling the parts, the electric heating element 62B or electric winding, possibly already coupled and/or welded to the pin 73B, is first inserted into the casing 61B and then welded to the casing 61B; magnesium powder or grains are then poured into the empty space between the winding and the casing; the assembly is subsequently closed with the centering ring 78B and is then subjected to a radial hammering process which reduces the diameter of the casing 61B and compacts the magnesium in order to leave no areas without insulator or with a reduced layer thereof.

It should be noted that, when installed, the centering ring 78B advantageously acts not only as a spacer and/or insulator of the pin from the casing walls, but also as a centering element during the manufacturing and/or assembly stages and as a plug, since it prevents the magnesium from coming out when radially hammering the casing 61B.

FIG. 6 also shows the coupling area between the casing 61B and the spacer 7B: the latter is at least partially hollow internally, and the coupling between the two is accomplished by fitting the casing 61B by interference into the spacer 7B and/or by selective braze welding, e.g. of the induction or laser type, so as to ensure a proper mechanical and airtight seal therebetween, e.g. without limitation, by brazing, in particular with silver and/or copper alloys, preferably preceded by mechanical and/or chemical cleaning of the surfaces to be welded. This coupling may be simplified by providing the terminal end of the spacer 7B with a flare 71B and by making the end portion of the casing 61B to be inserted into the spacer 7B slightly tapered.

As far as the spacer 7B is concerned, it is shown in detail in FIG. 6: it comprises a hollow bushing 72B, i.e. a suitably shaped tubular element, coupled on one side to the casing 61B as previously described and on the other side to the terminal 8B.

The hollow bushing 72B has, on the side facing the terminal 8B, two radial fins 74B jutting out from the surface of the hollow bushing 72B, in particular in a radial direction and/or in annular form, thereby defining a seat 75B for a gasket 10B, which is also visible in FIG. 4.

This gasket 10B is placed in abutment with and/or tight against the spacer 7B and the body 2 of the feeding duct, so as to prevent the fuel from leaking out from inside the feeding duct 1.

The end of the spacer 7B coupled to the terminal 8B has a sealing profile, preferably consisting, in the example shown, of one or more radial fins jutting out from the surface of the hollow bushing 72B, in particular in a radial direction and/or in annular form, which will be discussed more in detail later on. The hollow bushing 72B is placed in a condition of electric contact with an electric conductor 83B" afferent to the terminal 8B, also shown in FIG. 7, preferably to the negative or ground conductor; this electric connection is preferably ensured by the particular shape of the electric conductor 83B" which is put on or engaged onto a suitable end or seat of the tubular element or bushing 72B, and/or by means of a respective weld, e.g. obtained by brazing, in particular with silver and/or copper alloys, or electric welding.

Internally the hollow bushing 72B has differentiated diameters to advantageously facilitate the assembly process and/or to prevent any short circuits; more in particular, the diameter of the region immediately close to the flare 71B is smaller than the diameter of the remaining part of the bushing.

As far as the centering insulator 77B is concerned, in addition to avoiding any electric contact between the hollow bushing 72B and the pin 73B, it advantageously also performs the function of keeping the latter centered with respect to the former, so as to avoid that any movement thereof, such as vibrations and/or deformations caused by temperature changes, might originate any short circuits; preferably it also provides thermal insulation of a portion of the terminal 8B.

The centering insulator 77B is preferably made of ceramic materials, e.g. alumina or steatite, whereas the hollow bushing 72B of the spacer 7B is preferably made of metal, e.g. steel, stainless steel or the like, and the body 81B of the terminal 8B is preferably made of plastic, e.g. polyamide (PA), e.g. PA66 preferably with 30% fibreglass, i.e. a type of nylon.

It must be considered that in operating conditions the casing 61B may reach temperatures around 500°-600° C., which might damage the plastic of the terminal 8B if there were no hollow bushing 72B and/or centering insulator 77B. In fact, the hollow bushing 72B advantageously performs a dual function: in the first place, it thermally insulates the terminal 8B from the casing 61B by dissipating a part of the heat produced by the winding and preventing the terminal 8B from suffering any damage due the high temperature, and in the second place it ensures or contributes to obtaining a proper centering of the latter within the feeding duct, so that it is substantially unaffected by problems related to engine vibrations.

As to the coupling between the spacer 7B and the terminal 8B, it may be achieved in different ways: for example, the plastic of the terminal 8B may be moulded over the end portion of the bushing 72B, thus obtaining several advantages.

For example, a first advantage is an easier assembly at relatively low costs; suitable measures, such as the provision of said reliefs 76B, may also improve the coupling and sealing between the two parts, thereby reducing the risk of any leaks in the interface or coupling region therebetween, obtaining surfaces or seats ensuring a better adhesion or seal between the plastic material and the metal material, and creating longer and more tortuous paths against potential infiltrations between the two materials.

Figure 7:
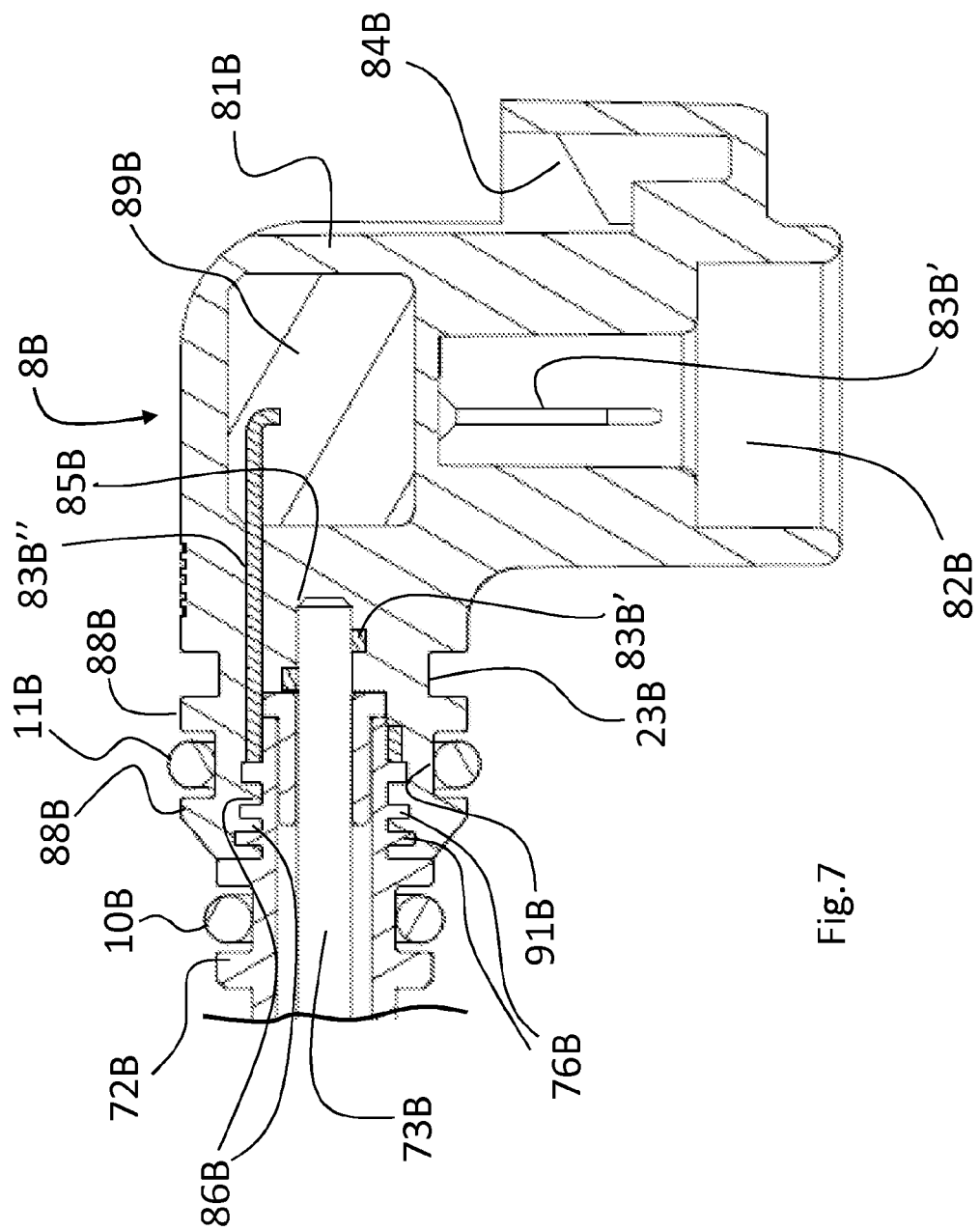
FIG. 7 is a sectional view of a third part of the electric heater of FIG. 3.

The terminal 8B shown in detail in FIG. 7, in fact, comprises a plastic body 81B which is preferably moulded over the terminal portion of the bushing 72B, so as to attain an optimum mechanical seal as well as a longer path for preventing possible infiltrations, deriving from the mutual engagement between the reliefs 76B and the corresponding complementary seats 86B formed during the process for moulding the plastic part of the terminal 8B over the bushing 72B.

Figure 10:
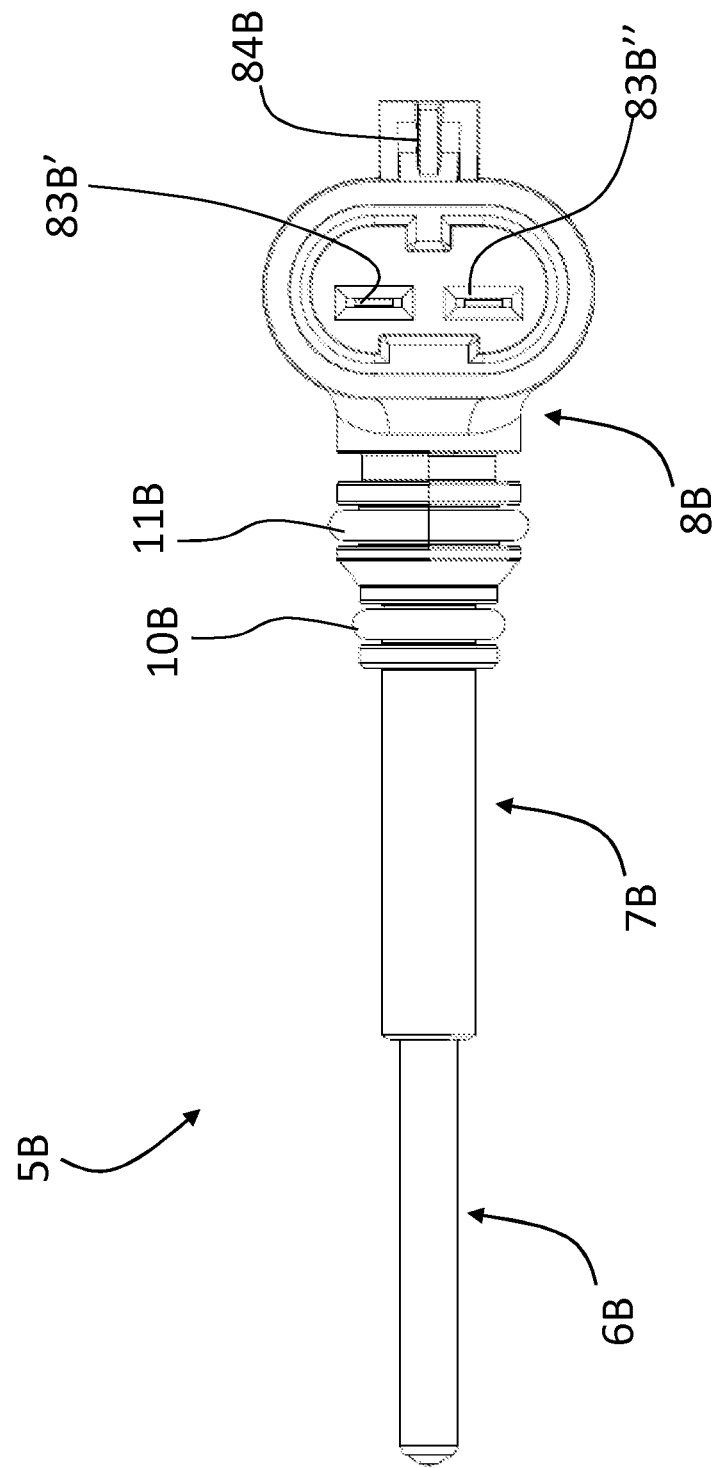
FIG. 10 is an outside view of the electric heater of FIG. 3.

The plastic body 81B ends on one side with a seat 82B for its coupling to a complementary electric connector or socket, within which seat 82B the electric conductors are arranged, in particular two electric terminals 83B' and 83B", visible in FIG. 10, one of which must be connected to a vehicle's ground and the other to the battery's positive terminal.

In order to obtain a more stable coupling between the terminal 8B and the complementary electric socket, on the latter there is an engagement profile 84B, shown herein in the non-limiting form of a seat for a snap-on coupling tooth and being of a per se known type that will not be described any further.

The pin 73B is engaged, in the engagement area 85B, into the plastic body 81B of the terminal 8B, in particular following the overmoulding process in which the latter is moulded over the former.

Figure 8:
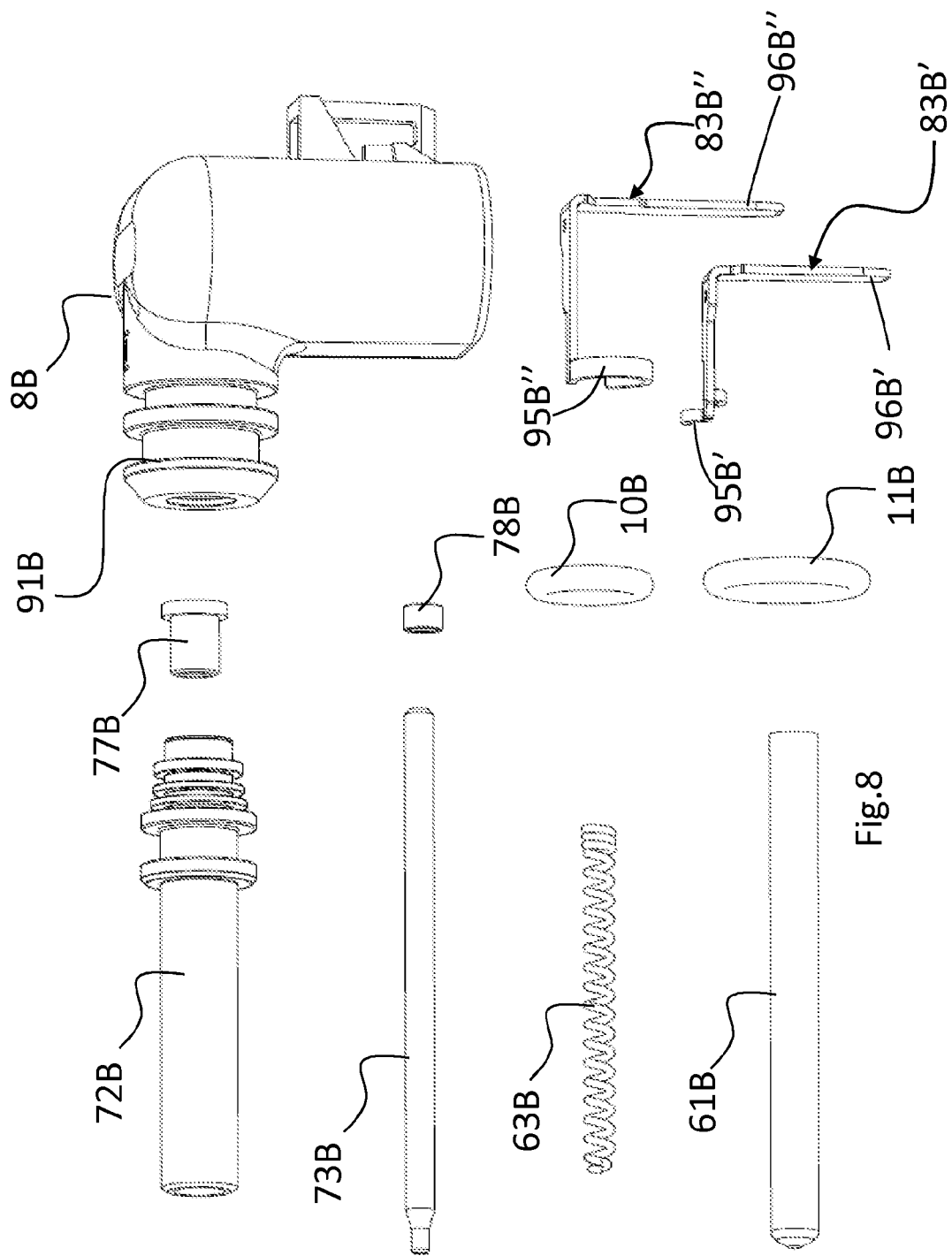
FIG. 8 is an exploded view of the electric heater of FIG. 3.

Near the engagement area 85B there are also the electric junctions with the conductor 83B', visible in the exploded view of FIG. 8: the latter and the pin 73B are coupled together preferably by selective induction braze welding with weld material, thus ensuring a very good electric connection.

The conductors 83B' and 83B" are shown in greater detail in FIG. 8, wherein it can be appreciated that they comprise coupling ends 95B' and 95B" respectively associated with the pin 73B and the bushing 72B, and free ends 96B' and 96B" adapted to engage with corresponding poles of an electric socket (not shown). The coupling ends 95B' and 95B" of the conductors 83B' and 83B" are preferably obtained by shearing and bending a flat metal strap, which is worked into an at least partly circular or semicircular profile.

Said coupling ends 95B' and 95B" are preferably obtained by means of one (95B") or two (95B') curved ends extending laterally with respect to an intermediate portion of the electric terminal 83B.

More in detail, in this non-limiting example the electric junction between the conductor 83B" and the hollow bushing 72B is accomplished by the conductor 83B" through its own end 95B" embracing at least partially one end of the hollow bushing 72B, whereas the junction between the conductor 83B' and the pin 73B is accomplished by the conductor 83B" through its own end 95B' embracing at least partially one end of the hollow bushing 72B: said junctions are then fixed preferably by selective glow braze welding with weld material, which also in this case allows to obtain a very good electric connection.

In this way, advantageously, the various parts remain secured in position during the process for moulding the plastic body 81B, which further contributes to insulating and securing the electric junctions.

In FIG. 7, reference numeral 89B indicates a terminal holder used for holding in position both conductors 83B' and 83B" along their extension when welding and/or moulding the plastic body 81B; it must however be pointed out that said terminal holder 89B is optional.

Said terminal holder 89B may advantageously be moulded in a thermoplastic material, such as polyphenylene sulphide (PPS).

The terminal 8B also comprises two radial or annular reliefs or fins 88B jutting out from the surface of the plastic body 81B at or near the end thereof engaged with the hollow bushing 72B, which fins 88B define a seat 91B for a gasket 11B, e.g. an O-ring, which, when mounted in the body 2, comes in abutment with and/or sits tight between the plastic body 81B of the terminal 8B and the inner wall of the hollow body 2 of the feeding duct 1, so as to ensure a proper seal against the risk of infiltration of external agents, such as dirt, wash water or the like.

It should be noted that the gasket 10B and the gasket 11B are arranged around the interface regions between metal and plastic, respectively of the hollow bushing 72B and of the terminal 8B, so as to insulate said interface region from fuel (through the effect of the gasket 10B) and from external agents (through the effect of the gasket 11B): this solution allows to keep the interface region within a tight environment.

By sealing into a tight environment the most delicate part of the electric heater 5B, i.e. the interface between metal and plastic, it is possible to couple together parts made of these two different materials without generating areas in which (due to different thermal expansion coefficients) leakage and/or infiltration points may be created in operation.

This measure, along with the fact that the presence of the bushing 72B contributes to dissipating a part of the heat produced by the winding, thus allows to use a terminal 8B made of plastic, which in prior-art solutions could not be used due to the problems discussed above.

Still with reference to the gaskets 10B and 11B, it should be noted that they have two different diameters: the gasket 10B, in particular, has a smaller diameter than the gasket 11B.

Such a difference in diameter simplifies the insertion and/or assembly steps.

In fact, during the assembly step each of the two O-rings or gaskets 10B must be widened only once in order to be positioned into its seat (the gasket 11B with the greater diameter must not necessarily be widened to go past the seat for the gasket 10B).

Note also that said dimension of said two gaskets 10B and 11B is different, in particular the gasket or O-ring 10B has a smaller diameter than the gasket or O-ring 11B, also in order to allow said gaskets to be inserted into two respective housings of the body 2 having a different diameter, in particular for the purpose of preventing the gaskets from being damaged during the assembly step.

In such a configuration, in fact, the electric heater 5B can be mounted into the body 2 with the gaskets having to follow a shorter path to fit by interference into the body 2; this means less risk of damage and less effort required for installing the heater into the body 2.

The electric heater 5B comprises seats 75B (for the gasket 10B) and 91B (for the gasket 11B) having different diameters, the former having a smaller diameter than the latter.

In this respect, it should also be noted that, with reference to FIG. 4, the hollow body ends with two different diameters, designated 25B e 26B in FIG. 4, the former and innermost one being smaller than the latter and outermost one, so as to create two seats for fitting said gaskets or O-rings 10B, 11B, while at the same time providing the advantage that the gaskets must follow a shorter path during the assembly step.

As far as the material of the gaskets 10B, 11B is concerned, at least one of them may be made of a fluorinated elastomer such as, for example, the one commercially available under the name "Viton" (registered trademark), in particular in order to offer better resistance to chemical agents.

As a further advantageous feature, it must be remarked that each spacer 7A, 7B preferably protrudes inside the duct defined by the hollow body 2 in the region thereof facing the outlet 4 closest to the end of the feeding duct 1, and substantially ends immediately after crossing said outlet 4.

The portion of the heating end 6B that protrudes from the spacer 7B coincides with that part of the casing 61B in which the winding 62B is arranged: as can be seen in the annexed figures, in fact, although the casing 61B extends inside the hollow bushing 72B, in that portion the electric heating element 62B is replaced by the pin 73B. This provides a twofold advantage: on the one hand, it ensures an effective heating of the fuel (because the heat produced by the winding only has to cross the wall of the casing 61B and the electrically insulating material 63B), while on the other hand the hollow bushing 72B is not subject to overheating because it does not contain the electric heating element 62B.

Figure 17:
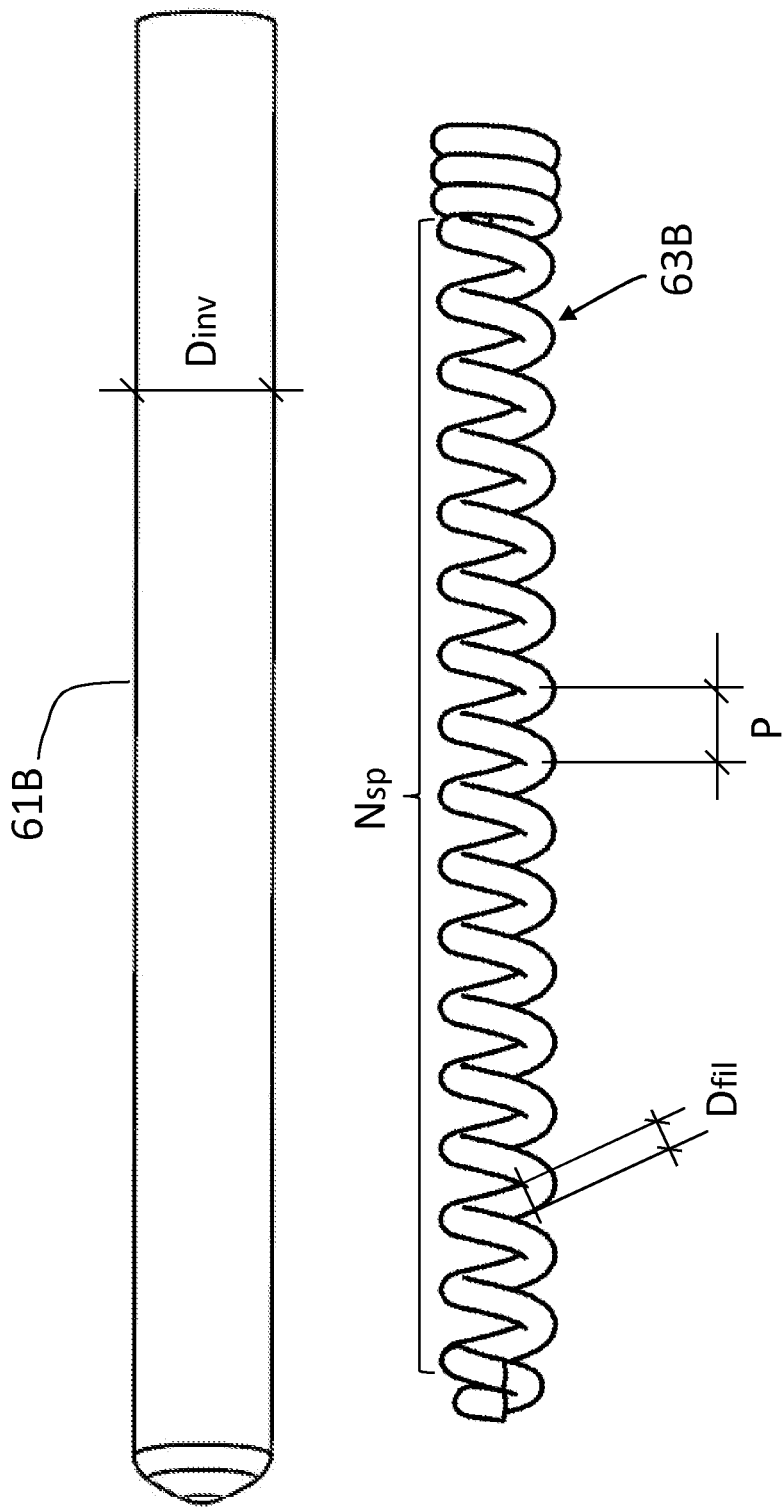
FIG. 17 shows some characteristic dimensions of parts of the electric heater of FIG. 3.

As regards the electric heating element 62B, tests carried out have shown that the ratio between the number of coils Nsp and the pitch P (shown in FIG. 17) is substantially greater than 2 and preferably greater than 4.

For example, for a number of coils $N_{sp}=11.5$ and a pitch $P=2.75$, then the ratio $N_{sp}/P=4.2$, whereas for $N_{sp}=13.5$ and $P=2.4$, then $N_{sp}/P=5.6$.

As an alternative thereto or in combination therewith, it has been observed that it is appropriate that the pitch P<6 mm, preferably P<3.5 mm to obtain a uniform and well-distributed heating.

The best results, in particular in terms of optimal heat transfer (for the purpose of warming up the fuel as quickly as possible) without hindering the fuel flow within the hollow body 2, are attained when the ratio $D_{int}/D_{fil}$ between the outside diameter of the cylindrical casing 61B and the diameter of the wire $D_{fil}$ of the coil 62B is in the range of 3 to 10, preferably 5 to 7. For example, for a casing 61B having an outside diameter $D_{inv}$=5 mm, the coil wire diameter may be $D_{fil}$=0.9 mm, the ratio therebetween being $D_{inv}/D_{fil}$=5.55; for a diameter $D_{inv}$=6 mm, the coil wire diameter may be $D_{fil}$=1.1 mm, the ratio therebetween being $D_{inv}/D_{fil}$=5.5.

As far as the feeding duct is concerned, in addition to the characteristics discussed above it may also advantageously be made of a plastic material such as, for example, PA66 (nylon) with 30% fibreglass, in that it is not necessary that it is electrically conductive, unlike in prior-art cases.

Of course, the type of plastic material may vary, e.g. should the electric heater be secured in a different way than previously described.

Many other changes may then be made by those skilled in the art, without however departing from the scope and teachings of the present invention.

Figure 12:
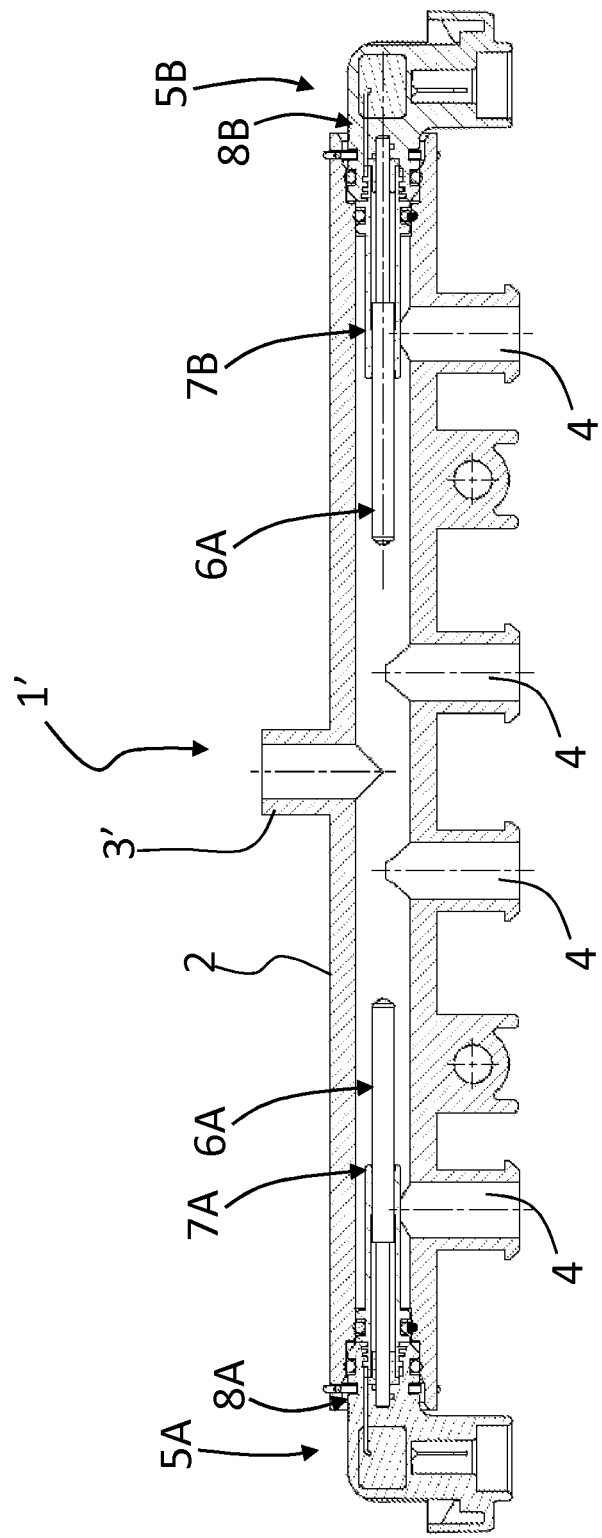
FIG. 12 shows a variant of the heating device of FIG. 1.

For example, FIG. 12 shows a first variant wherein the same reference numerals identify the same parts (which will not be described any further for the sake of brevity); let it suffice to say that in this case the feeding duct 1' has a fuel intake port 3' which is centered relative to the longitudinal extension of the duct 1' itself, whereas the feeding duct 1 had one such port 3 in the proximity of one of the open sides of the hollow body 2.

Said variant of FIG. 12 offers the advantage that it allows a more uniform distribution of the fuel within the feeding duct 1', with the heater 5A, 5B having less influence in terms of occupation of the fuel passage.

Figure 13:
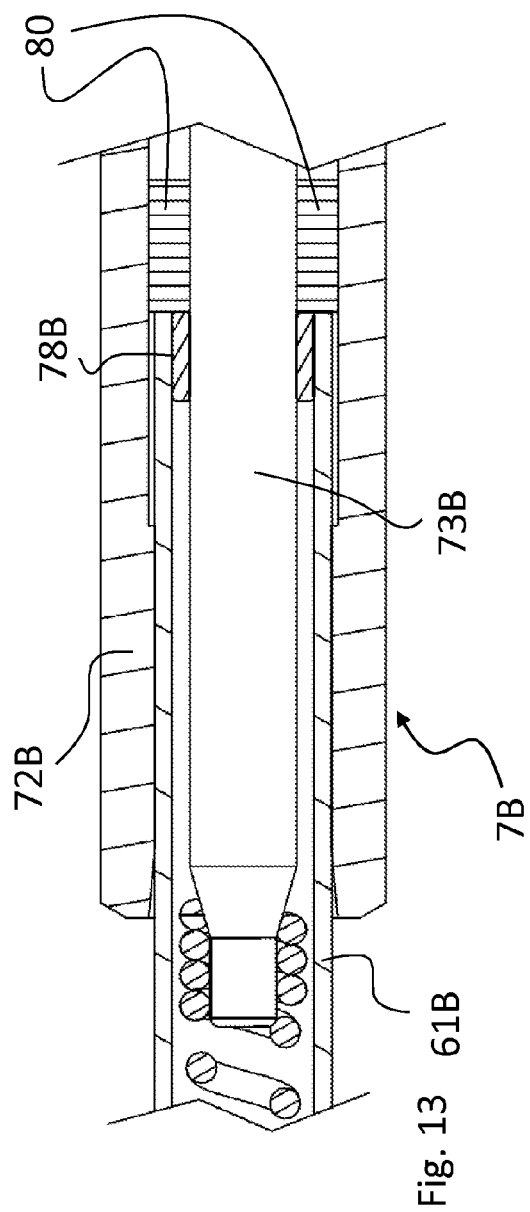
FIG. 13 shows a detail of a first variant of the electric heater of FIG. 3.

A further advantageous variant is shown in FIG. 13: it illustrates a detail of the region where the hollow bushing 72B is coupled to the casing 61B: in this variant, in order to improve the seal between the two, an additional insulating means 80 is arranged at the terminal edge of the casing 61B.

Said additional insulating means is a ring-shaped insulator, e.g. a resin or the like, which is preferably positioned around the terminal edge of the casing 61B and abuts against the inner wall of the hollow bushing 72B, so as to improve the seal between the two and ensure a more reliable centering of the pin 73B extending therethrough.

Figure 14:
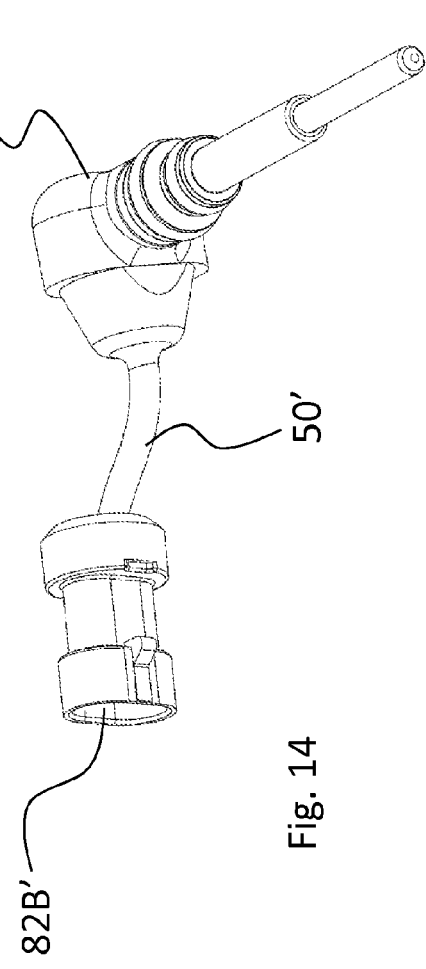
FIG. 14 shows a second variant of the electric heater of FIG. 3.

Yet another variant is shown in FIG. 14: in this case, the seat 82B' with the conductors 83'B and 83"B is movable relative to the electric heater 5B', i.e. the electric connector of the heater is equipped with a wiring, and the electric wiring is made by means of a length of electric cable 50; said electric cable 50 preferably connects electrically the conductors 83'B and 83"B of the seat 82B' to the pin and the bushing of the electric heater 5B', which is similar to the device 5B previously described.

This variant has the advantage that the feeding duct equipped with said warm-up devices can be easily housed inside the engine compartment of a vehicle, thereby overcoming any constraints caused by the presence of obstacles or wiring harnesses of various kinds.

Figure 15:
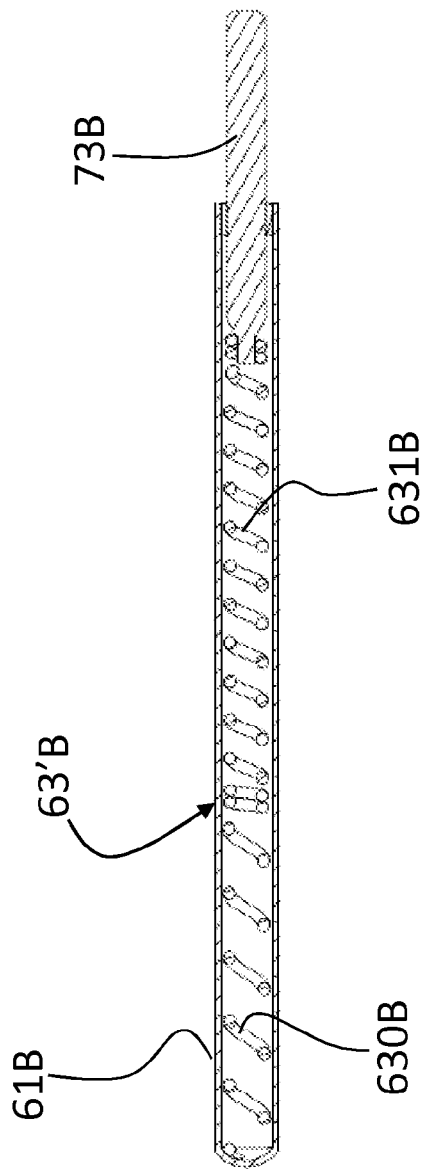
FIG. 15 shows a detail of a third variant of the electric heater of FIG. 3.

A variant of the winding is shown in FIG. 15.

In this solution, the winding 63'B has two different windings: a first portion 630B placed inside the casing 61B, on the closed side thereof which protrudes from the hollow bushing, and a second portion 631B preferably placed inside the casing 61B, on the side thereof which, when installed, is inside the hollow bushing.

The first 630B and second 631B winding portions are connected in series to each other, and the portion 631B is a PTC (Positive Temperature Coefficient) resistor which increases its resistance with temperature.

By appropriately choosing said resistor it is advantageously possible to limit any overtemperature in a substantially automatic manner and without needing any electronic feedback control: in fact, when a malfunction or the like causes the temperature to exceed a predefined threshold temperature, the resistance of the portion 631B will increase, thereby reducing the Joule effect and thus the heating of the portion 630B.

As further variants, it should be pointed out that at least a part of the feeding duct 1 or 1', in particular the hollow body 2, may have different shapes other than the tubular one shown herein; for example, it may have a generally prismatic shape.

Still with reference to the hollow body 2, it may be made of a metal such as, by way of non-limiting example, steel, stainless steel, aluminium alloys, titanium alloys and the like, or alternative materials such as ceramic materials of a type suitable for use in chemically aggressive environments.

According to another variant, which may be implemented as an alternative to or in combination with the one described above, it is conceivable to employ a control circuit comprising or controlling at least one temperature sensor, in particular a temperature sensor associated with each outlet 4 and/or with the intake port 3, 3' of the feeding duct 1, so as to control at least the temperature of the fuel inside the feeding duct, thereby overcoming the drawbacks of the time-based control used in the prior art.

Alternatively, said at least one temperature sensor may be a part of the warm-up device; for example, it may be mounted to the body 2 or obtained directly by deposition, in an area close to said outlets 4 and/or to the intake port 3, 3'.

It is also advantageously possible to employ a heating system comprising at least one feeding duct and one electric heater of the above-described type 5A, 5B, or even a different type of heater, which comprises a control of the so-called Pulse Width Modulation (PWM) type.

This type of control is widely used in the prior art also for regulating the electric power supplied to a load, e.g. in inverters, in order to adjust the speed of direct-current motors. Its basic principles will not therefore be described any further herein; for further details reference should be made to the technical and scientific literature on this matter.

In the present case, the modulation may be regulated as a function of the temperature detected by one or more temperature sensors, which sense the fuel temperature or more in general a reference temperature, such as, for instance, the temperature of the outside environment. As an alternative, the modulation may be regulated as a function of a time or a different quantity detected.

To this end, it is possible to employ an electronic circuit, e.g. of the microcontroller type, preferably provided with memory means; reference values may be predefined in said circuit and/or in said memory means, in particular for changing the modulated value accordingly, e.g. by detecting a quantity or a temperature, comparing the detected value with predefined values, and computing a control value for controlling said PWM modulation or circuit. By using such a type of control it is possible to minimise the energy consumption of the electric heater without adversely affecting warm-up speed, or to optimise the operation of the engine, in particular in terms of fuel consumption and/or exhaust emissions.

According to a further possible example, the system comprises a control unit which receives at its inputs the temperature values read by one or more sensors, e.g. from a temperature sensor arranged inside the feeding duct; advantageously, this solution provides direct monitoring of the fuel temperature.

Alternatively, it is conceivable to employ temperature sensors installed elsewhere, e.g. in the branching duct, near the injectors, or the like.

In this manner, the control unit can define the power percentage to be delivered and/or the power on time as a function of temperature, so as to overcome the problems of the indirect control systems used in the prior art, which are based upon the on time of the heating element.

By using the PWM control, in fact, it is possible to implement a method for warming up fuel with regulated power voltage, so as to drastically limit the energy consumption related to fuel heating, or to optimise fuel heating for an optimal operation of the vehicle's engine.

According to the method of the present invention, in fact, when the control unit receives at its input a signal representative of a cold engine, e.g. a signal detected by a sensor positioned on the engine which detects, e.g. in the case of ethyl alcohol, a temperature lower than 10° C., in particular lower than 5° C., a step is carried out wherein maximum power is supplied to the heating element, so as to warm up the fuel quickly; in this regard, it must also be pointed out that such temperatures may vary, since they are greatly dependent on the type of fuel used.

When afterwards the control unit receives a second signal representative of a warm engine, e.g. a signal detected by a sensor positioned on the engine which detects a temperature higher than 60° C., preferably close to 80° C., the power output is reduced by means of the aforementioned PWM control.

Figure 16:
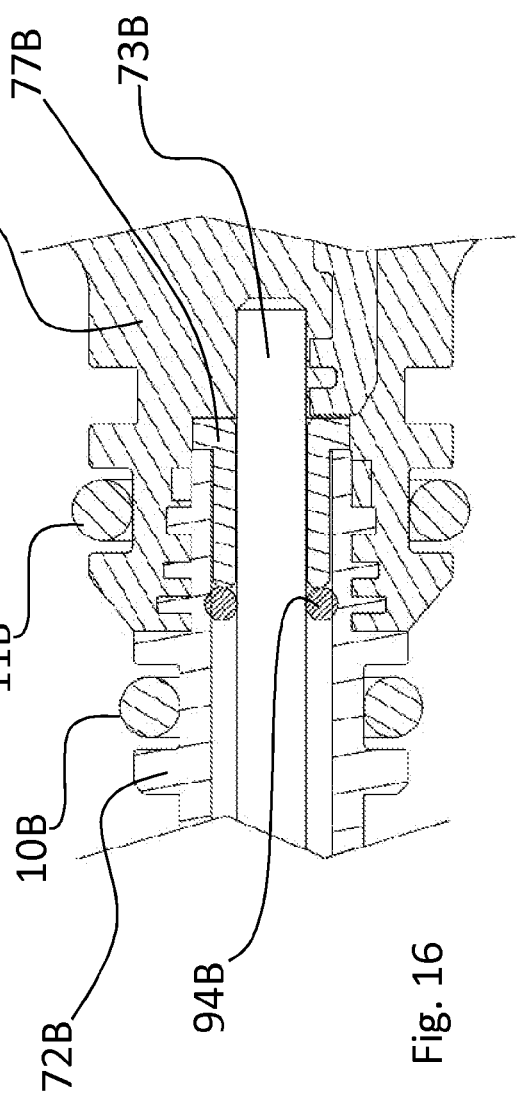
FIG. 16 shows a detail of a fourth variant of the electric heater of FIG. 3.

A further variant is shown in FIG. 16: in this case, in order to improve the seal between the hollow bushing 72B and the pin 73B there is a gasket 94B, e.g. an O-ring or the like.

Said gasket 94B is positioned between the hollow bushing 72B and the pin 73B in the proximity of the end portion thereof, and is preferably in abutment with the centering insulator 77B.

An additional advantage offered by this variant is that the centering insulator 77B is protected against possible fuel infiltrations, and may therefore be made of materials unsuited to withstand chemical attacks from fuel.

Although in the above examples the advantageous features of the invention have been described in combination with one another for the sake of brevity, they may nonetheless be employed individually or alternatively, since they may also be applied to devices or systems other than those described herein by way of non-limiting example.

The invention claimed is:

1. An electric heater for fuel of endothermal engines, the electric heater comprising:
   a heating end adapted to be inserted into a hollow body of a conduct of a device for heating said fuel, wherein said heating end is in contact with the fuel when the fuel is present in the conduct and wherein said heating end includes an electric heating element;
   a terminal for supplying power to said electric heating element; and
   a spacer;
      wherein the heating end, the spacer, and the terminal are coupled to one another, the spacer being placed in a condition of electric contact with the terminal and with the heating end,
   wherein the heating end comprises an outer casing having a tubular shape, wherein, a first end of the outer casing is closed and a second end of the outer casing is coupled to the spacer so as to ensure a mechanical and airtight seal between the outer casing and the spacer, wherein the outer casing internally houses the electric heating element and is in electrical contact with the electric heating element, and
   wherein the spacer protrudes inside a feeding duct defined by the hollow body in a region thereof facing an outlet closest to an end of the feeding duct.

2. The electric heater according to claim 1, wherein the terminal is configured to supply power to said electric heater and is adapted to be at least partly associated with an aperture or seat in said hollow body and is at least partly made of plastic material.

3. The electric heater according to claim 1, the spacer further comprising at least one metal part intended for being coupled to at least one plastic part of said terminal in an interface region within a sealed environment.

4. The electric heater according to claim 3, wherein said sealed environment is at least partly defined by a first gasket placed between said metal part of said spacer and said hollow body and a second gasket placed between said plastic part of said terminal and said hollow body.

5. The electric heater according to claim 1, wherein either said electric heater or said terminal comprises a housing for a fixing means allowing said electric heater or said terminal to be secured to said hollow body.

6. The electric heater according to claim 1, wherein the electric heating element comprises a first electric winding portion and a second electric winding portion, wherein said second electric winding portion is a positive temperature coefficient (PTC) resistor.

7. The electric heater according to claim 1, wherein the electric heating element is an electric winding obtained by means of an electric wire having a diameter $D_{fil}$ mm, wound at a pitch P and having a number of coils $N_{sp}$, wherein a casing of the electric heating element is cylindrical and has an outside diameter $D_{inv}$ mm, and wherein at least one of the following conditions is met:

$N_{sp}/P>2$, or $N_{sp}/P>4$, $P<6$ mm, $3<D_{inv}/D_{fil}<10$, or $5<D_{inv}/D_{fil}<7$.

8. The electric heater according to claim 1, the electric heater configured to be controlled through a pulse width modulation (PWM) control system.

9. An electric heater for fuel of endothermal engines, the electric heater comprising:
   at least one heating end adapted to be inserted into a hollow body of a conduct of a device for heating said fuel, wherein said at least one heating end includes at least one electric heating element and wherein said at least one heating end is in contact with the fuel when the fuel is present in the conduct; and
   at least one terminal for supplying power to said electric heater; and
   said at least one electric heating element and said one terminal adapted to be coupled together and to operate optimally when associated with said hollow body;
   said heating end comprising a tubular casing, wherein said electric heating element is housed within said casing and said electric heating element is in electric contact with said casing,
   a pin partially inserted into said casing and in electric contact with said electric heating element, wherein the pin is electrically connected to one electric conductor of the terminal.

10. The electric heater according to claim 9, wherein said heater comprises a hollow bushing adapted to connect the casing which houses said electric heating element to a plastic body of said terminal, wherein said casing and said hollow bushing house the pin, said pin being electrically insulated and centered relative to said hollow bushing.

11. The electric heater according to claim 9, wherein said at least one electric heating element comprises a first electric winding portion and a second electric winding portion, wherein said second electric winding portion is a positive temperature coefficient (PTC) resistor.

12. The electric heater according to claim 9, wherein the at least one electric heating element is an electric winding obtained by means of an electric wire having a diameter $D_{fil}$ mm, wound at a pitch P and having a number of coils $N_{sp}$, wherein the casing is cylindrical and has an outside diameter $D_{inv}$ mm, and wherein at least one of the following conditions is met:

$N_{sp}/P>2$, or $N_{sp}/P<4$,

P<6 mm $3<D_{inv}/D_{fil}>10$, or $5>D_{inv}/D_{fil}>7$.

13. The electric heater according to claim 9, wherein the electric heater is configured to be controlled through a pulse width modulation (PWM) control system.

14. A fuel heating device for an endothermal engine, the fuel heating device comprising:
    a feeding duct that comprises the hollow body fitted with at least one fuel inlet and at least one fuel outlet; and
    said electric heater according to claim 9 inserted into said hollow body.

15. The fuel heating device, according to claim 14, wherein said hollow body comprises at least two apertures which, in an assembled condition, are closed by at least two respective electric heaters associated with said hollow body by shape coupling.

16. The fuel heating device according to claim 14, wherein said electric heater comprises said electric heating element arranged within said hollow body, and wherein said hollow body comprises a plurality of fuel outlets, said electric heating element extending between two adjacent outlets.

17. An electric heater for fuel of endothermal engines, the electric heater comprising:
    a heating end adapted to be inserted into a hollow body of a conduct of a device for heating the fuel, wherein the heating end includes an outer casing and an electric winding that is housed inside the outer casing;
    a terminal for supplying power to the electric winding; and
    a spacer;
    wherein:
        the outer casing, the spacer, and the terminal are coupled to one another,
        the spacer is in a condition of electric contact with the terminal, and with the outer casing,
        the electric winding is in electric contact with the outer casing,
        the outer casing of the heating end is in contact with the fuel when the fuel is present in the conduct, and
        a first end of the outer casing is closed and a second end of the outer casing is coupled to the spacer so as to ensure a mechanical and airtight seal between the outer casing and the spacer.

* * * * *